United States Patent

[11] 3,628,214

[72] Inventor Robert H. MacKay
Fort Wayne, Ind.
[21] Appl. No. 852,409
[22] Filed Aug. 22, 1969
[45] Patented Dec. 21, 1971
[73] Assignee Lincoln Manufacturing Company, Inc.
Ft. Wayne, Ind.

[54] WHEEL OR ROLLER STRUCTURE WITH BRAKE
2 Claims, 7 Drawing Figs.

[52] U.S. Cl. .................................................. 16/35,
16/46
[51] Int. Cl. ..................................... B60b 33/00,
A47b 91/00
[50] Field of Search ........................................... 16/35

[56] References Cited
UNITED STATES PATENTS
2,695,683  11/1954  Forbes .......................... 16/35 X
2,707,794  5/1953   Kramcsak ..................... 16/35
3,026,558  3/1962   Mulholland ................... 16/35 X
3,228,089  1/1966   Turner .......................... 16/35 X
3,493,085  2/1970   Libhart ......................... 16/35 X FOREIGN PATENTS
243,299  12/1946  Switzerland ................. 16/46
244,560  4/1947   Switzerland ................. 16/46

*Primary Examiner*—Paul R. Gilliam
*Attorney*—Jeffers and Rickert

ABSTRACT: The invention relates to a caster wheel or roller adapted for being mounted on an article which is to be rolled from place to place. The wheel may be provided with a selectively operable brake for locking it against rotation. A double bearing is interposed between the wheel supporting fork of the center wheel assembly and the part of the assembly that attaches to the supported article.

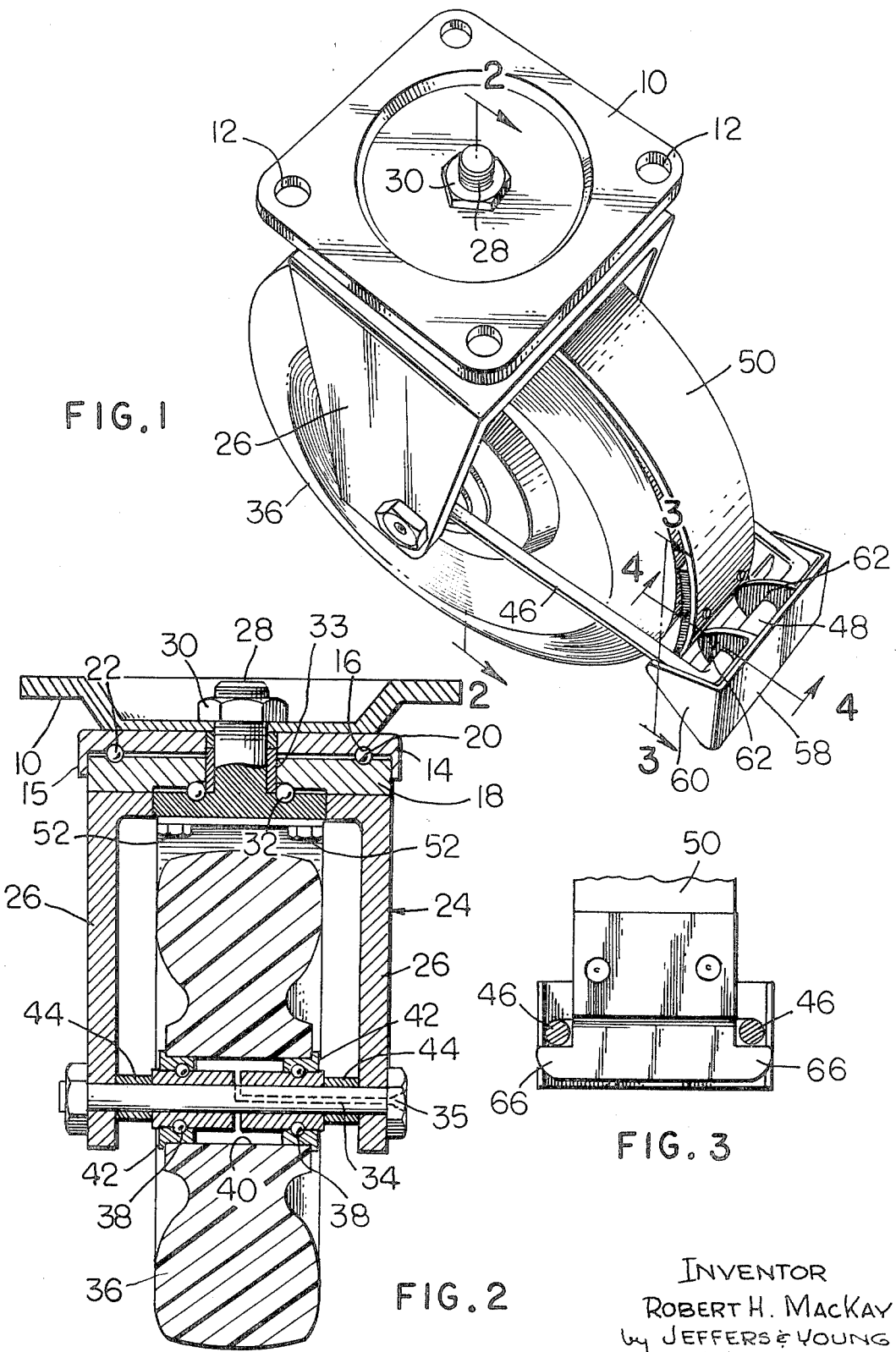

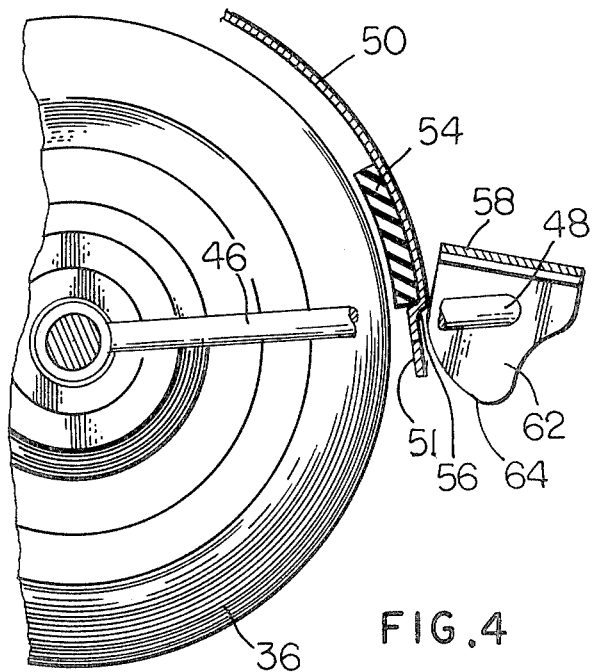
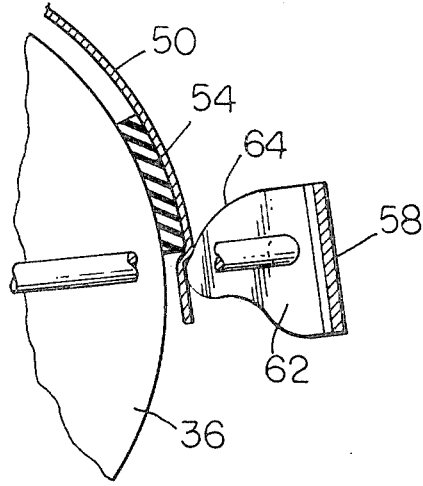
FIG.4        FIG.5
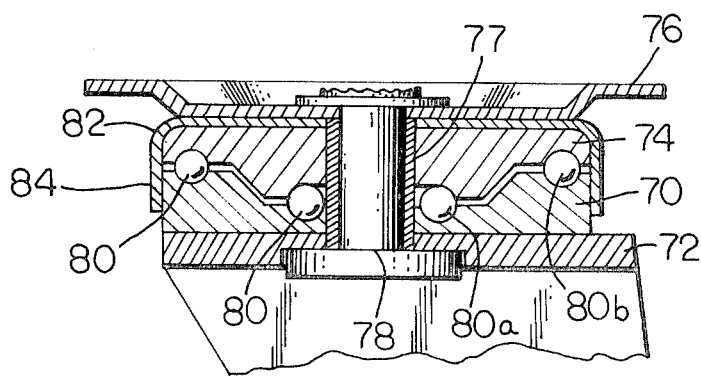
FIG.6
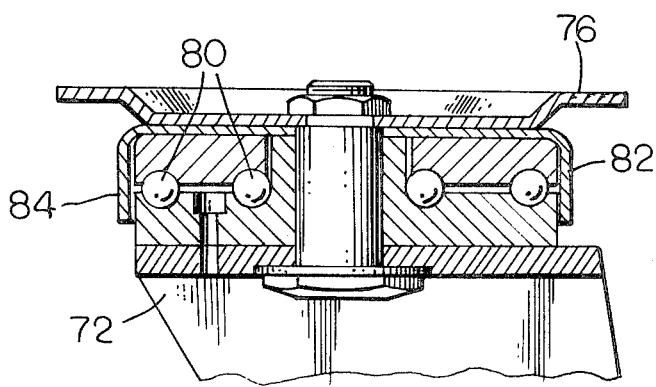
FIG.7
INVENTOR
ROBERT H. MACKAY
by JEFFERS & YOUNG
Attorneys

WHEEL OR ROLLER STRUCTURE WITH BRAKE

The present invention relates to wheels or rollers of the type that are mounted on the bottom of articles such as furniture and office equipment, carts and racks in bakery shops, stores, and the like, for facilitating moving thereof and is particularly concerned with such a wheel having a brake associated therewith for locking it against rotation.

Wheels and rollers of the nature with which the present invention is concerned are well known and are widely used and wheels or rollers of this type are known, which have brake arrangements incorporated therein. A wheel or roller having a brake arrangement incorporated therein is particularly useful in connection with a piece of equipment, or a cart or rack, which it is desired to move from place to place, but which it is desired to hold against movement when in a desired location.

Heretofore, wheels or rollers of the nature referred to, and which may be in the form of caster wheels or rollers, which have brakes built therein have been relatively complex and expensive and sometimes have been awkward to operate. Still further, the wheels, when having a brake incorporated therein, have been of a special manufacture, thus requiring the manufacturer to maintain extra inventory and to have special tools.

Having the foregoing in mind, a primary objective of the present invention is the provision of a wheel or roller of the nature referred to of improved design.

A still further object of this invention is the provision of a wheel or roller of the nature referred to which has a highly effective and easily operable, but nevertheless quite inexpensive brake arrangement associated therewith.

A further object of the invention is to provide a brake mechanism which may be installed or removed by use of simple hand tools.

Still another object of the present invention is the provision of a wheel or roller of the nature referred to of the caster type which is extremely strong and which can be manufactured and sold as a simple caster wheel, and which can readily have a brake mechanism according to the present invention incorporated therein.

The foregoing objects as well as still other objects and advantages, of the present invention will become more apparent upon reference to the following specification, taken in connection with the accompanying drawings, in which:

FIG. 1 is a perspective view showing a wheel or roller with a brake incorporated therein according to the present invention;

FIG. 2 is a vertical sectional view indicated by cutting plane 2—2 on FIG. 1;

FIG. 3 is a fragmentary sectional view indicated by cutting plane 3—3 on FIG. 1;

FIG. 4 is a sectional view indicated by cutting plane 4—4 on FIG. 1, showing the brake mechanism in released condition;

FIG. 5 is a view like FIG. 4, but shows the brake in actuated position;

FIG. 6 is a fragmentary vertical sectional view showing a modification; and

FIG. 7 is a fragmentary vertical sectional view showing still another modification.

Referring to the drawings somewhat more in detail, in FIGS. 1 and 2, it will be seen that the wheel or roller structure of the present invention comprises an upper platelike frame member 10, having holes 12 therein for receiving screws or bolts for connection of the frame to the bottom of the article which it is to support.

Beneath frame 10 is a block 14 having a downwardly facing ball race 16 formed therein. Beneath block 14 is another block 18 having an upwardly facing ball race 20 therein which registers with race 16, so as to receive balls 22 therebetween to form a multilevel bearing swivel mechanism.

On the underside of block 18 is attached a fork 24 having laterally spaced dependent arms 26. A stud, or shaft element, 28 projects upwardly from the top of fork 24 and has its upper end threaded to receive nut 30, which locks the assembly in assembled relation. Ball bearings 32 are interposed between the head of stud 28 and block member 18. A bushing 33 surrounds stud 28 and may be formed of a plastic or other similar material. Block 14 preferably has a skirt or dependent axial flange 15 telescoping over the upper end of block 18.

Extending laterally between the lower ends of arms 26 is a bolt, or shaft, 34 on which is rotatably supported a wheel 36 as by the ball bearings 38. Wheel 36 preferably has a somewhat resilient peripheral portion. or substantially the entire body of the wheel can be formed of resilient material. The outer races of ball bearings 38 slidably fit in bore 40 of wheel 36 and flanges 42 on the outer ends of the outer races engage opposite sides of wheel 36. Shaft 34 may be drilled, as at 35, for permitting lubricant to be supplied to bearings 38.

The arms 26 are laterally spaced a distance greater than the axial dimension of wheel 36 and sleeve portions 44 are rotatably mounted on bolt 34 between the inner sides of arms 26 and the adjacent ends of the inner races and bearings 38.

Sleeve portions 44 form, or are fixed to, the inner ends of the legs of a U-shaped support 46, which has a leg extending along each side of wheel 36, and a transverse leg 48 forming the closed end of the support and interconnecting the outer ends of legs 46. Leg 48 is disposed parallel to bolt 34.

The axis of stud, or shaft, 28, when viewed from the side of wheel 36 in FIG. 1, is offset laterally from the vertical plane containing the axis of bolt 34 so that the illustrated structure is in the form of a caster wheel, which, as known, will pivot about the axis of stud 28 to accommodate the wheel to the direction of movement of the article supported thereby.

According to the present invention, an arcuate resilient strip 50 is provided arranged in radially spaced relation to the periphery of wheel 36 and secured to the upper closed end of fork 24 as by cap screws 52.

As will best be seen in FIG. 4, resilient strip 50 extends about the wheel to about the horizontal level of bolt 34 and at its free end, on the side facing wheel 36, has fixed thereto a brake element 54 adapted for being pressed into braking engagement with the periphery of wheel 36. The extreme lower end of resilient strip 50 is offset radially inwardly of the wheel, as at 56, forming an angular ledge.

Reference to FIG. 1, taken in connection with FIGS. 4 and 5, will show that a plate 58 is provided on the opposite side of leg 48 from wheel 36 substantially parallel with leg 48 and having end parts 60 bent radially inwardly toward the axis of wheel 36 at the outsides of legs 46.

Plate 58 carries cam means in the form of a pair of cam elements 62 connected to the plate and having apertures through which leg 48 extends for pivotally supporting plate 58 and cam elements 62 on the support member consisting of legs 46 and leg 48. Plate 58 and cam elements 62 form a cam for actuating the brake element end of resilient element 50 toward wheel 36.

As will be seen in FIGS. 4 and 5, cam elements 62 have their edges 64 noncircularly arranged with respect to the axis of leg 48 so that when plate 58, together with cam elements 62, is pivoted from its FIG. 4 position to its FIG. 5 position, the lower end of the resilient strip 50 is pressed radially inwardly and causes brake element 54 firmly to engage the periphery of wheel 36 and hold it against rotation.

The extreme lower end of resilient strip 50 is provided with laterally extending ears 66, which will engage beneath legs 46 and stop the U-shaped support in a predetermined lower position. When the U-shaped support rests on ears 66, plate 58, together with its cam elements 62, can be manually tilted between its FIGS. 4 and 5 positions.

In either case, when the brake is actuated, resilient member 50 presses outwardly against cam elements 62, but the line of action of this force is so close to the plane of the U-shaped support that the position of the cam made up of plate 58 and cam elements 62 is stable and the brake cannot become accidentally released. In operation, the cam elements engage the offset extremity 51 at the lowermost end of resilient member 50 and come to a stop against the shoulder or ledge where resilient member 50 is offset at 56.

In the arrangement described, the brake can easily be set merely by pressing downwardly on plate 58, as with the toe, and the brake can as easily be disengaged by lifting plate 58 upwardly.

It will be appreciated that the brake is quite simple and inexpensive but, nevertheless, is highly effective and, further, that it can be incorporated into substantially any wheel structure of the nature disclosed.

FIGS. 6 and 7 show modifications bearing the same numerals, where applicable, and wherein a first block member 70 is mounted on the upper closed end of wheel fork 72, while a second block member 74 is disposed beneath platelike frame member 76. A stud 78 retains the fork and frame member and block members in assembled relation with ball bearings 80 engaging races formed on the upper face of block member 70 and the lower face of block member 74.

In FIG. 6, the ball bearings comprise a radially inner series 80a at a lower level and an radially outer series 80b at an upper level, whereas in FIG. 7, the two series of balls are at the same level. A sleeve 77 of plastic material surrounds stud 78 in FIG. 6 and a similar sleeve may be used in FIG. 7.

In both modifications an inverted cup-shaped member 82 is provided having its bottom wall clamped between frame member 76 and the block member 74 therebeneath and having a peripherl axial portion 84 dependent about the periphery of upper block member 74 and telescoping over a portion of the axial length of lower block member 70, thereby to cover the gap between block members 70 and 74.

In any of the modifications illustrated, the platelike frame part at the top is preferably a stamping and the wheel fork is preferably a casting. The blocks containing the bearing races may be formed of a metal or a plastic, such as Delrin. The balls which journal the wheel fork on the platelike frame member may be metal, glass, ceramic or plastic.

Any of the described bearing structures could be interposed between the wheel fork and the uppermost platelike frame member of the wheel structure.

It is understood that modifications can be made within the scope of the appended claims.

What is claimed is:

1. A wheel structure adapted for being secured to the bottom of an article for rollingly supporting the article and comprising: a platelike frame having means for connection thereof to the said article, a fork pivotally connected to the bottom of the frame at the closed end for rotation on a vertical axis on said frame and having spaced arms dependent from the frame, a wheel rotatably mounted between the lower ends of said arms, a resilient member having one end connected to said fork at the upper closed end thereof and extending about the periphery of said wheel on one side thereof in radially spaced relation thereto to a point spaced upwardly from the bottom of the wheel, said resilient member having its other end offset radially inwardly toward said wheel and forming a ledge, a brake element mounted adjacent said ledge on the side of said resilient member which faces said wheel, a U-shaped support having legs extending along the sides of said wheel and the sides of said resilient member in axially spaced relation thereto and mounted so as to be freely pivotal on said fork, a cam carried by and rotatable about said U-shaped support, said cam adapted to engage the offset portion of the resilient member which faces away from said wheel and stopping against said ledge when in brake actuated position, the line of action of the force acting on said cam when the cam is moved into effective braking position being substantially parallel to the plane of said U-shaped support so the cam is stable and rotationally limited in said effective braking position.

2. A wheel structure according to claim 1, which includes a first block member on top of said fork having upwardly facing radially spaced concentric ball races on the top face, a second block member on the bottom of said fork directly over said first block member and having downwardly facing radially spaced concentric ball races on the bottom thereof registering with the said races on said first block member, balls disposed between and engaging said registering races, a connecting shaft element extending through said fork and frame and block members on the axis of said races and retaining the said fork and frame and block members in assembled relation, and an inverted cup member having its bottom wall disposed between said frame and said second block member and having its peripheral portion dependent about the periphery of said second block member and telescopically surrounding at least the upper portion of the periphery of said first block member.

* * * * *